(12) United States Patent
Fang et al.

(10) Patent No.: US 9,436,988 B2
(45) Date of Patent: Sep. 6, 2016

(54) METHOD AND SYSTEM OF CLASSIFYING DEFECTS ON A WAFER

(71) Applicant: Hermes-Microvision, Inc., Hsinchu (TW)

(72) Inventors: Wei Fang, Milpitas, CA (US); Zhaoli Zhang, San Jose, CA (US); Jack Jau, Los Altos Hills, CA (US)

(73) Assignee: HERMES-MICROVISION, INC., Hsinchu (TW)

( * ) Notice: Subject to any disclaimer, the term of this patent is extended or adjusted under 35 U.S.C. 154(b) by 0 days.

(21) Appl. No.: 14/325,802

(22) Filed: Jul. 8, 2014

(65) Prior Publication Data

US 2014/0321730 A1 Oct. 30, 2014

Related U.S. Application Data

(63) Continuation of application No. 13/269,038, filed on Oct. 7, 2011, now Pat. No. 8,805,054, which is a continuation-in-part of application No. 12/343,201, filed on Dec. 23, 2008, now abandoned.

(51) Int. Cl.
*G06K 9/00* (2006.01)
*G06T 7/00* (2006.01)

(52) U.S. Cl.
CPC ............ *G06T 7/0008* (2013.01); *G06T 7/001* (2013.01); *G06T 2207/20081* (2013.01); *G06T 2207/30148* (2013.01)

(58) Field of Classification Search
None
See application file for complete search history.

(56) References Cited

U.S. PATENT DOCUMENTS

| 7,085,408 B1 * | 8/2006 | Chung-Chi Jim ............ 382/149 |
| 8,111,898 B2 * | 2/2012 | Pang ............................. 382/141 |
| 2009/0074286 A1 | 3/2009 | Kitazawa et al. |

* cited by examiner

*Primary Examiner* — Chan Park
*Assistant Examiner* — Elisa Rice
(74) *Attorney, Agent, or Firm* — WPAT, PC; Justin King

(57) ABSTRACT

A method of classifying the defects on a wafer having some same chips and corresponding system is provided. After receiving images formed by scanning the wafer using a charged particle beam, these images are examined such that both defective images and defect-free images are found. Then, the defect-free images are translated into a simulated layout of the chip, or a database is used to provide the simulated layout of the chip. Finally, the defects on the defective images are classified by comparing the images with the simulated layout of the chip. The system has some modules separately corresponds to the steps of the method.

15 Claims, 6 Drawing Sheets

METHOD AND SYSTEM OF CLASSIFYING DEFECTS ON A WAFER

RELATED APPLICATION

This application is a Continuation Application of U.S. application Ser. No. 13/269,038, filed on Oct. 7, 2011, which is a Continuation-In-Part patent application of Ser. No. 12/343,201 filed on Dec. 23, 2008, the entire contents of which are incorporated herein by reference.

FIELD OF THE INVENTION

The invention relates to a method and a system of classifying defects, especially a method and a system of classifying defects by a simulated layout.

BACKGROUND OF THE INVENTION

After a wafer is scanned by a charged particle beam, there are numerous scanned images respectively corresponds to numerous chips of the wafer. Clearly, some scammed images are defect-free images when the corresponding chips have no defect, and other scanned images are defective images when each corresponds chip has at least one defect.

There are some known arts to find which scanned image is defective image and to find which portion(s) of the defective image corresponds to the defect(s). For example, die-to-die, die-to-database, and array mode. However, almost all these known arts achieve the results by comparing the scanned images corresponding to the same chip. Hence, these known arts only can find which portion(s) of which chip corresponds to defect(s), but can not find what kind of the defect(s) is (at least can not find what semiconductor structure corresponds to the defect(s)). In short, it cannot identify a defect from a lead, a MOS or an electrode under the situation of lacking the layout of the chip. Even the defect feature is important for improving the manufacturing process.

SUMMARY OF THE INVENTION

Method and system to classify the defects by using a simulated layout. The simulated layout corresponds to the real layout of the chips to be scanned. Hence, when the accuracy of the simulation is high enough, the defects on the scanned images could be properly classified according to what portions of the simulated layout corresponds to the defects on the scanned images.

The simulated layout can be achieved by some known arts, such as manual drawing layout based image and/or converting image into vector based on auto edge tracing. Moreover, the simulated layout also can be achieved by any known, on-developing or new appeared arts, while the invention never restricts the details.

The proposed method may be programmed and merged to the system of scanning electron microscope (SEM).

Method of classifying the defects on a wafer. The method includes receiving images formed by a charged particle beam, examining images to find the defective images and defect-free images, translating the defect-free images into a simulated layout of a chip and classifying the defects on the defective images by comparing the images with the simulated layout of the chip. Herein, the step of translating the defect-free image into the layout may be omitted as the simulation thereof exists.

System of classifying the defects on a wafer. The system has different modules separately corresponds to different steps of the above present method.

DESCRIPTION OF THE EXEMPLARY EMBODIMENTS

It is easy to find defects of a chip on a wafer, there are some well-know skills to find the positions of the defects. But, it is difficult to classify the defect type in absence of the chip layout as it is necessary to compare the image of the chips with the real layout to identify the features of the defects. As usual, only the IC-design house has the real layout but the factory does not have the real layout, even it is helpful that the factory can immediately analyze and classify the defects for improving the manufacture of the IC chips. However, for current semiconductor industry, the yield of manufacturing semiconductors can be increased beyond 99%, so most chips on a wafer are defect-free and only few of the chips are defective, so it is easy to identify the defective images and the defect-free images. By translating the defect-free images into a simulated layout, and then comparing the defective image with the simulated layout, the defect feature may be automatically classified based on the messages about what semiconductor structure corresponds by the defects.

Figure 1:
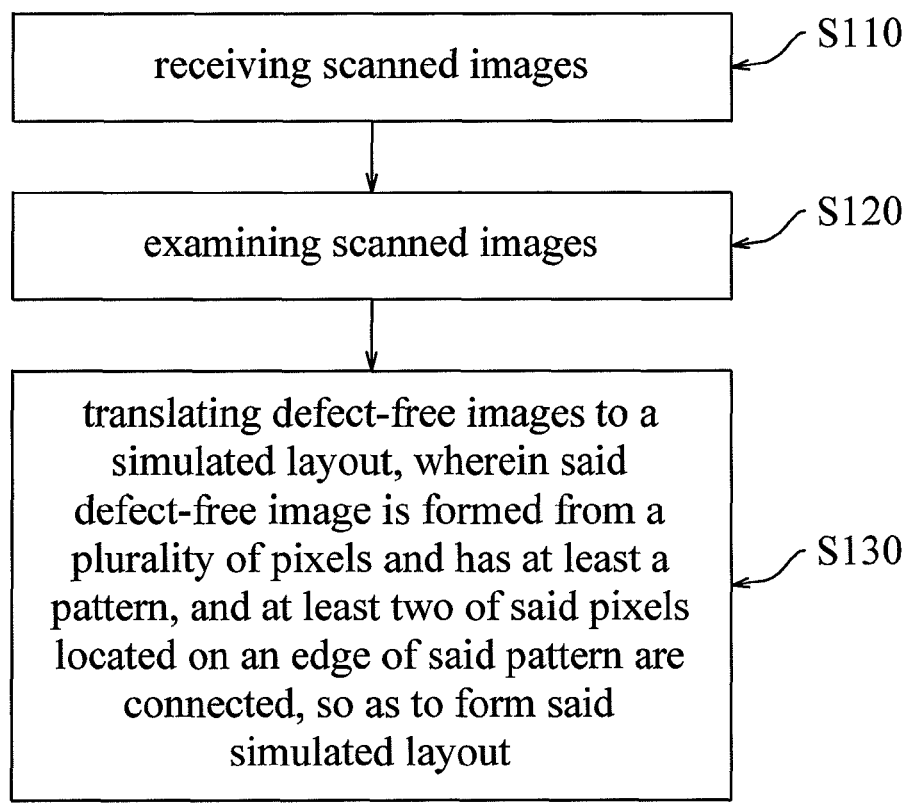
FIG. 1 is an exemplary method for translating images into a simulated layout according to an embodiment of the present invention.

FIG. 1 is an exemplary method of the present invention for illustrating a process of translating images into a simulated layout. As illustrated in FIG. 1, at step S110, images of same chips on a wafer formed by scanning the wafer using a charged particle system are received. Next, at step S120, the images are examined to find the defect-free images. Next, at step S130, the defect-free images are translated into a simulated layout, wherein the defect-free image is formed from a plurality of pixels and has at least a pattern, and at least two of the pixels located on an edge of the pattern are connected, so as to form the simulated layout. Herein, step 110 could be achieved by using the conventional SEM, and step 120 could be achieved by many well-known skills, such as die-to-die and array mode. Herein, step 130 could be achieved by using some known skill, such as manual drawing layout based image and converting image into vector based on auto edge tracing. Indeed, all steps 110/120/130 also could be achieved by any on-developing and new skills. One key of the embodiment is the combination of the three steps 110/120/130, but not the details of each step 110/120/130.

Figure 5:
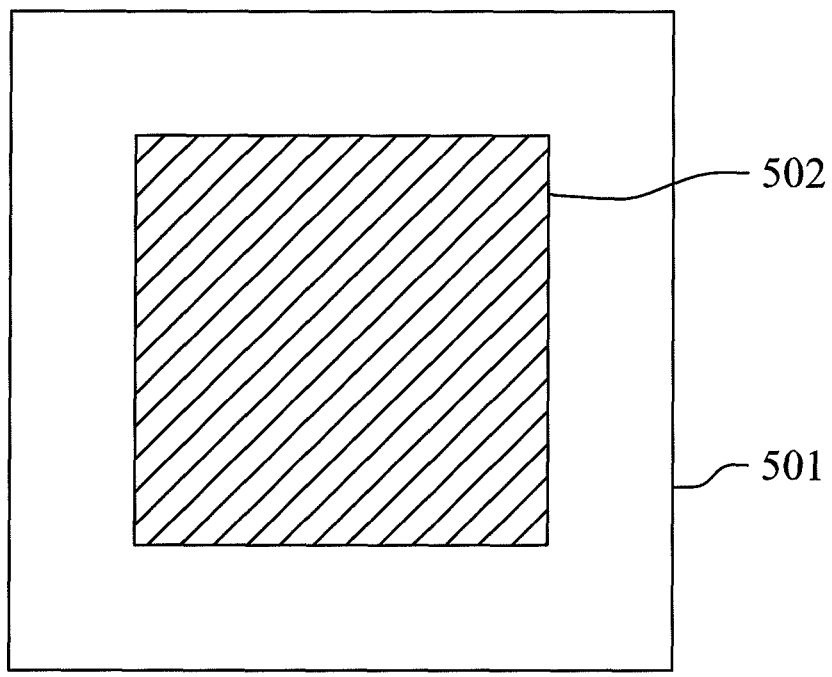
FIG. 5 is an exemplary chip having a feature according to an embodiment of the present invention.
Figure 6:
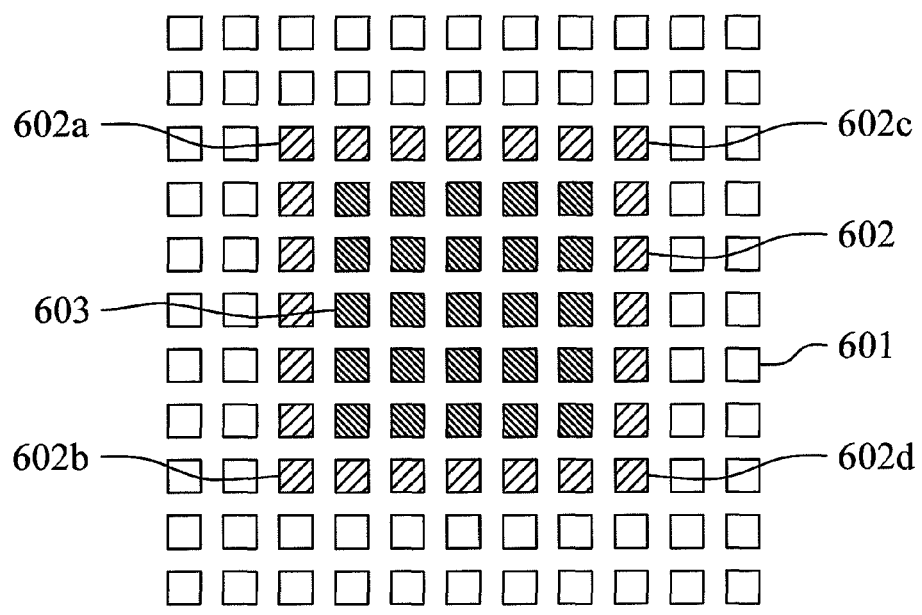
FIG. 6 is an exemplary defect-free image corresponding to the chip as illustrated in FIG. 5.

FIG. 5 is an exemplary chip having a feature according to an embodiment of the present invention, and FIG. 6 is an exemplary defect-free image corresponding to the chip as illustrated in FIG. 5. Referring to FIG. 5 and FIG. 6 together, in a specific embodiment, a feature 502 on a chip 501 is formed as a rectangle as illustrated in FIG. 5, and thus a defect-free image 600 formed by scanning the chip 501 using a charged particle system is formed as illustrated in FIG. 5. Herein, the defect-free image 600 can be formed from a plurality of pixels 601, 602, 603 and have at least a pattern. In the present embodiment, the pattern is formed from the pixels 602, 603 and formed as a rectangle similar to the shape of the chip 501, wherein the pixels 601 are located outside the pattern, the pixels 602 are located on an edge of the pattern, and the pixels 603 are located inside the pattern. After that, the defect-free image 600 can be saved as a GDS file or an OASIS file. Thus, at step S130, it is able to automatically read and then connect only the four pixels 602*a*, 602*b*, 602*c*, 602*d* by a computing system, so as to simply translate the defect-free image 600 into the simulated layout. Alternatively, it is able to manually sketch and then connect only the four pixels 602*a*, 602*b*, 602*c*, 602*d* as well.

Once getting the simulated layout, the corresponding relationship between a scanned image and the simulated layout can be known, such that what kind of semiconductor structure (such as line, via, gate, drain etc) is located on the position corresponds to a defect on the scanned image. Therefore, the defects can be classified according to what kind of semiconductor structure is corresponded. It should be noted that the pattern as shown in FIG. 6 is illustrated for a simple example only, and thus it is to be understood that the invention is not to be limited by the specific illustrated embodiment. In other non-illustrated embodiments, the pattern may further has a more complicated contour with a plurality of edges and a plurality of turning points located between each two adjacent edges, and thus it is able to automatically read and then connect at least some of the turning points for simply translating the defect-free image into the simulated layout as well.

Figure 2:
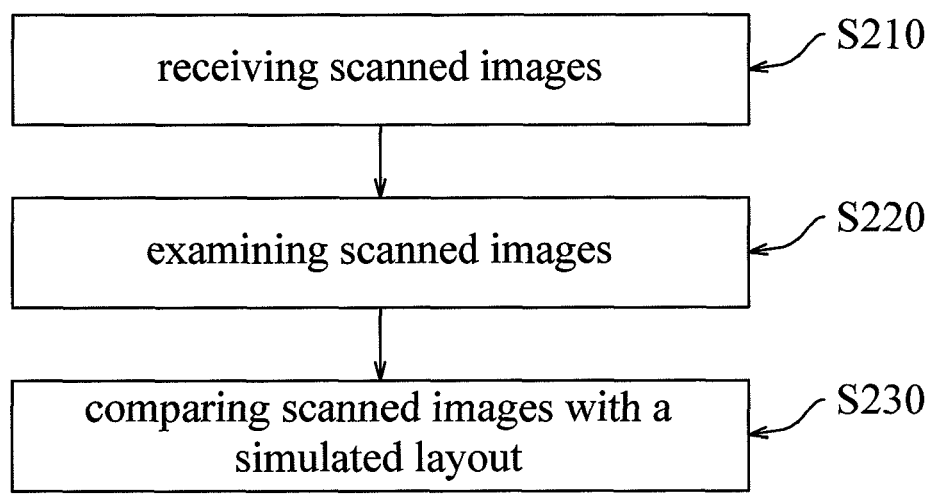
FIG. 2 is an exemplary method for illustrating a process of classifying defects of same chips on a wafer according to an embodiment of the present invention.

FIG. 2 is an exemplary method for classifying defects of same chips on a wafer according to an embodiment of the present invention. As illustrated in FIG. 2, at step S210, images of the same chips on a wafer formed by scanning the wafer using a charged particle system is received. Next, at step S220, the images are examined to find the defective images corresponding to the defective chips. Next, at step S230, the defective images are compared with a simulated layout of such chip to classify the defect feature of the defective chips.

Clearly, FIG. 2 is an application of FIG. 1. Because there are many wafers having the same chips, when these chips are mass products. Hence, once at least one wafer is examined by the method shown in FIG. 1, a useful simulated layout of such chip could be achieved. Then, when examine other wafers having the same chips, it is simple to directly use the existent simulated layout but not find a new simulated layout for a new wafer again.

Figure 3:
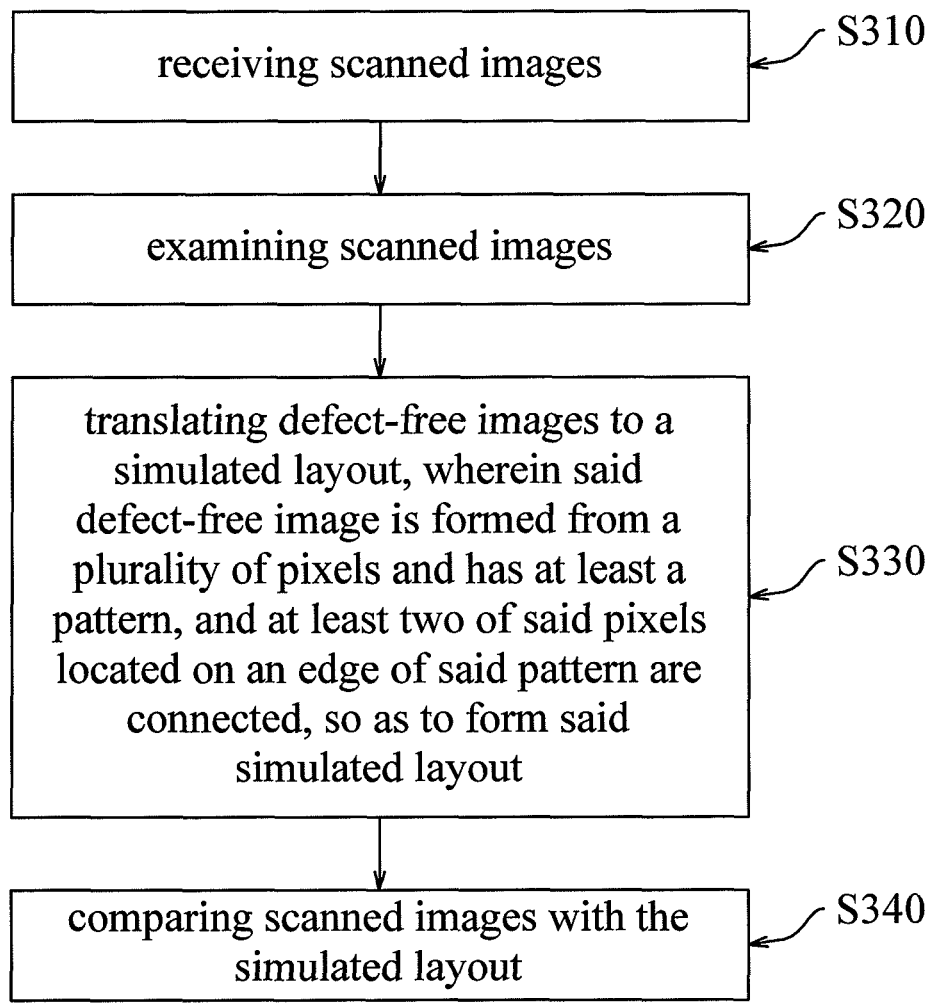
FIG. 3 is another exemplary method for illustrating the process of classifying defects of same chips on a wafer according to an embodiment of the present invention.

FIG. 3 is another exemplary method for classifying defects of same chips on a wafer according to an embodiment of the present invention, which includes integrating the process of translating a simulated layout and classifying the defect type. As illustrated in FIG. 3, at step S310, images of same chips on a wafer formed by scanning the wafer using a charged particle beam system are received. Next, at step S320, the images are examined to recognize the defective and defect-free images of the same chips respectively corresponding to the defective chips and defect-free chips.

Next, at step S330, the defect-free images are translated into a simulated layout, wherein the defect-free image is formed from a plurality of pixels and has at least a pattern, and at least two of the pixels located on an edge of the pattern are connected, so as to form the simulated layout. Next, at step S340, the defect feature of defective chips is classified by comparing the defective images with the simulated layout. Similarly, referring to FIG. 5 and FIG. 6 together again, in a specific embodiment, at step S330, it is able to automatically read and then connect only the four pixels 602*a*, 602*b*, 602*c*, 602*d* by a computing system, or manually sketch and then connect only the four pixels 602*a*, 602*b*, 602*c*, 602*d*, so as to simply translate the defect-free image 600 into the simulated layout.

Figure 4:
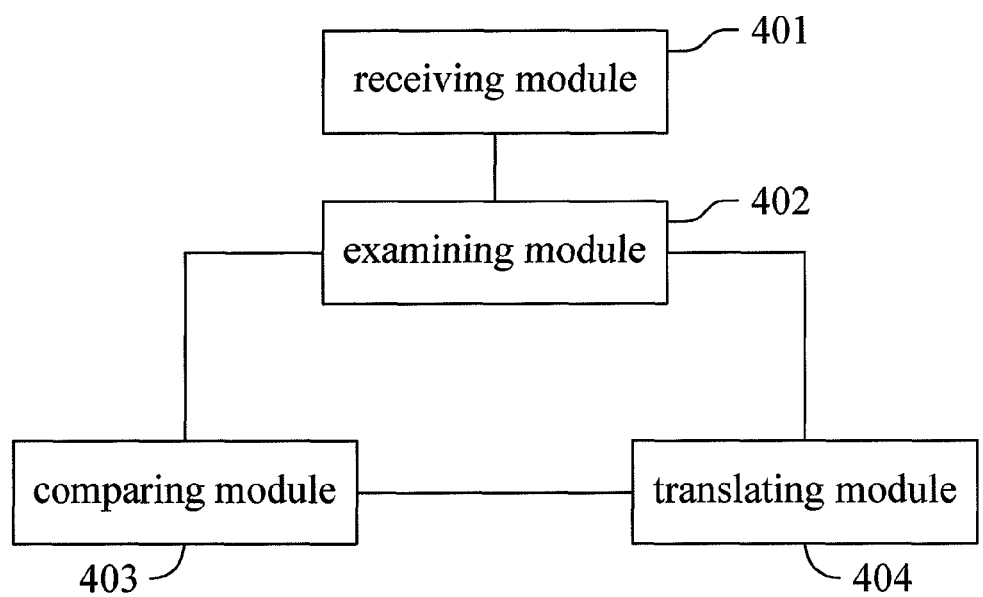
FIG. 4 is an exemplary system for classifying defects of same chips on a wafer according to an embodiment of the present invention.

FIG. 4 is an exemplary system for classifying defects of same chips on a wafer according to an embodiment of the present invention. The system comprises a receiving module 401, an examining module 402 and a comparing module 403. The receiving module 401 could receive some images acquired by a charged particle beam, wherein the images respectively correspond to some chips having similar feature on an examined wafer (if no defect and/or no tolerance, they should have same feature). The examining module 402 is electrically connected with the receiving module 401 and could examine the images to find at least a defect-free image and at least a defective image, wherein the defective image has at least one defect feature corresponding to a defect on a chip. The comparing module 403 is electrically connected with the examining module 401 and could compare the defective image with a simulated layout corresponding to a real layout of the chips to classify the defect(s) on the chip. Of course, beside the simulated layout is existed before the operation of the proposed system, the system further comprises a translating module 404 electrically connected with the examining module 402 and the comparing module 403 for translating a defect-free image into the simulated layout, wherein the defect-free image is found by examining the image. In the present embodiment, referring to FIG. 5 and FIG. 6 together again, the method of translating the defect-free image into the simulated layout is similar to the step S130 and the step S330 in the previous embodiments. In another word, it is able to automatically read and then connect only the four pixels 602*a*, 602*b*, 602*c*, 602*d* by a computing system, or manually sketch and then connect only the four pixels 602*a*, 602*b*, 602*c*, 602*d*, so as to simply translate the defect-free image 600 into the simulated layout.

The comparing module 403 maps a location of the defect feature into a mapped location of the simulated layout. Then, by checking what kind of semiconductor structure is located on the mapped location, it is easy to classify the defect. For example, the defect is classified as a hole defect when a hole located on the mapped location, the defect is classified as a line defect when the mapped location corresponds to a line between chips, and the defect is classified as an omissible defect when the mapped location corresponds to neither a semiconductor structure nor a conductive structure around said semiconductor structure. Herein, as an example, the semiconductor could be a MOS, a capacitor, a doped region, an inductor, and so on, and the conductive structure could be a metal line, a plug, and so on.

It should be noted that the details of each module 401/402/403/404 is not restricted. All well-known, on-developing and to be appeared skills could be used to achieve these modules. For example, the receiving module 401 and the examining module 402 could be achieved by the well-known apparatus for performing the die-to-die or array module. The function of the comparing module 403 essentially is comparing two figures and finding the message of a specific portion of a figure, it is a well-known image analysis operation and then there are many well-known apparatus could be used. The translating module 404 also could be achieved by any apparatus capable of translating an image object to a vector object, such as a computer with a software for converting image into vector based on auto edge tracing.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of classifying defects on a wafer, comprising:
   receiving a defect-free image of a defect-free chip
   translating said defect-free image into a simulated layout that corresponds to a real layout of said defect-free chip, wherein said defect-free image has at least a pattern, and said simulated layout represents an outer border of said pattern and is generated by connecting first pixel and a second pixel and both said first pixel and said second pixel are located on said outer border of said pattern;
   receiving a first image of a first chip;
   examining said first image for determining said first chip having a defect; and
   comparing said first image with said simulated layout to classify said defect on said first chip when said first chip is determined having said defect.

2. The method as claimed in claim 1, further comprising using said simulated layout to classify defects on another wafer having a plurality of similar chips.

3. The method as claimed in claim 1, wherein said step of examining said first image is chosen from a group consisting: die-to-die, array mode, and a combination.

4. The method as claimed in claim 1, wherein said step of translating said defect-free image is chosen from a group consisting: manual drawing layout based image, convert image into vector based on auto edge tracing, and a combination thereof.

5. The method as claimed in claim 1, wherein said step of comparing said first image with said simulated layout includes mapping said defect into a mapped location of said simulated layout, wherein said defect is classified based on a structure located on said mapped location.

6. A method of classifying defects on a wafer, comprising:
   receiving a first plurality of images from a first plurality of chips and a second plurality of images from a second plurality of chips acquired by a charged particle beam, wherein said first plurality of chips and said second plurality of chips having similar feature
   examining said first plurality of images and said second plurality of images, wherein at least a defective image is found from one of said first plurality of images, and at least a defect-free image are is found from one of said second plurality of images, and said defective image shows at least one defect on a said one of said first plurality of chips;
   translating said defect-free image into a simulated layout that corresponds to a real layout of said one of said second plurality of chips, wherein said defect-free image has at least a pattern, said simulated layout represents an outer border of said pattern and is generated by connecting a first pixel and a second pixel and both said first pixel and said second pixel are located on said outer border of said pattern; and
   comparing said defective image with said simulated layout to classify said defect on said one of said first plurality of chips.

7. The method as claimed in claim 6, wherein said plurality of second images are obtained from a group consisting: said examined wafer, a previous wafer examined before said examined wafer, and combination thereof.

8. The method as claimed in claim 6, wherein said step of examining said second plurality of images is chosen from a group consisting: die-to-die, array mode and a combination thereof.

9. The method as claimed in claim 6, wherein said step of translating said defect-free image into said simulated layout is chosen from a group consisting: manual drawing layout based image Of and converting image into vector based on auto edge tracing.

10. The method as claimed in claim 6, wherein said step of comparing said defective image with said simulated layout includes mapping said defect into a mapped location of said simulated layout, wherein said defect is classified according to a structure located on said mapped location.

11. A system for classifying defects on a wafer, comprising:
    a receiving module for receiving a plurality of images acquired by a charged particle beam, wherein said images respectively correspond to a plurality of chips having similar feature on an examined wafer;
    an examining module electrically connected with said receiving module for examining said images to find at least a defect-free image and at least a defective image, wherein said defective image has at least one defect feature corresponding to a defect on one of said plurality of chips;
    a translating module electrically connected with said examining module for translating said defect-free image into a simulated layout that corresponds to a real layout of said plurality of chips, wherein said defect-free image has at least a pattern, said simulated layout represents an outer border of said pattern and is generated by connecting a first pixel and a second pixel and both said first pixel and said second pixel are located on said outer border of said pattern; and
    a comparing module electrically connected with said examining module and said translating module for comparing said defective image with said simulated layout to classify said defect on said one of said plurality of chips.

12. The system as claimed in claim 11, wherein said examination module examine said plurality of images by using a method chosen from a group consisting: die-to-die, die-to-database, array mode, and a combination thereof.

13. The system as claimed in claim 11, wherein said translating module translates said defect-free image to said simulated layout by using a method chosen from a group consisting: manual drawing layout based image and converting image into vector based on auto edge tracing.

14. The system as claimed in claim 11, wherein said comparing module maps said defect into a mapped location of said simulated layout, wherein said defect is classified based on a structure located on said mapped location.

15. The method as claimed in claim 1, wherein said first pixel is located at a first corner of said outer border.

* * * * *